United States Patent [19]

Brown et al.

[11] 4,394,075
[45] * Jul. 19, 1983

[54] SUPPORT APPARATUS

[76] Inventors: Garrett Brown, 508 Pine St., Philadelphia, Pa. 19106; Arnold O. Di Giulio, 4522 Woodman Ave., Sherman Oaks, Calif. 91423

[*] Notice: The portion of the term of this patent subsequent to Jun. 17, 1997, has been disclaimed.

[21] Appl. No.: 159,657

[22] Filed: Jun. 16, 1980

Related U.S. Application Data

[63] Continuation of Ser. No. 700,544, Jun. 28, 1976, Pat. No. 4,208,028, which is a continuation-in-part of Ser. No. 506,326, Sep. 16, 1974, Pat. No. 4,017,168.

[51] Int. Cl.³ ............................................. G03B 17/00
[52] U.S. Cl. ..................... 352/243; 224/185; 248/179; 354/82; 354/293
[58] Field of Search ............... 352/243; 354/70, 81, 354/82, 293; 248/18, 123, 179, 183, 280, 281, 284; 224/185, 5 R, 5 V

[56] References Cited

U.S. PATENT DOCUMENTS

| | | | |
|---|---|---|---|
| 218,210 | 8/1879 | Alling et al. | 248/281 |
| 817,207 | 4/1906 | Wheeler | 354/82 |
| 991,101 | 5/1911 | Smith | 248/281 |
| 1,070,525 | 8/1913 | Pieper | 248/281 |
| 1,272,845 | 7/1918 | Peck et al. | 248/280 |
| 2,090,439 | 8/1937 | Carwardine | 248/280 |
| 2,506,228 | 5/1950 | Lofstrand | 248/123 |
| 2,552,205 | 5/1951 | Moss | 354/82 |
| 2,700,524 | 1/1955 | Lauterbach | 248/280 |
| 2,787,434 | 4/1957 | Jacobsen | 248/280 |
| 2,941,776 | 6/1960 | Lauterbach | 248/284 |
| 2,997,242 | 8/1961 | Grosholz . | |
| 3,041,060 | 6/1962 | Jacobsen | 248/280 |
| 3,103,257 | 9/1963 | Richards . | |
| 3,226,073 | 12/1965 | Jacobsen | 248/280 |
| 3,409,261 | 11/1968 | Leporati | 248/284 |
| 3,417,953 | 12/1968 | Hillquist et al. | 248/280 |
| 3,498,577 | 3/1970 | Mehr | 248/280 |
| 3,543,019 | 11/1970 | Jacobsen . | |
| 3,774,873 | 11/1973 | Krogsrud | 248/280 |

Primary Examiner—Monroe H. Hayes
Attorney, Agent, or Firm—Weiser, Stapler & Spivak

[57] ABSTRACT

A support apparatus for a portable weight such as man carried camera comprising at least a pair of rotatably interconnected arms, one end of which is rotatably and pivotally supported by a support vest worn by an operator and the other end of which is arranged and configured to support weight such as a camera and a spring means provided on each arm to compensate for the weight applied to the end of each arm. In operation, the weight mounted on the support apparatus is spacially decoupled from the operator and the position of the weight is not affected by motion of the operator.

7 Claims, 9 Drawing Figures

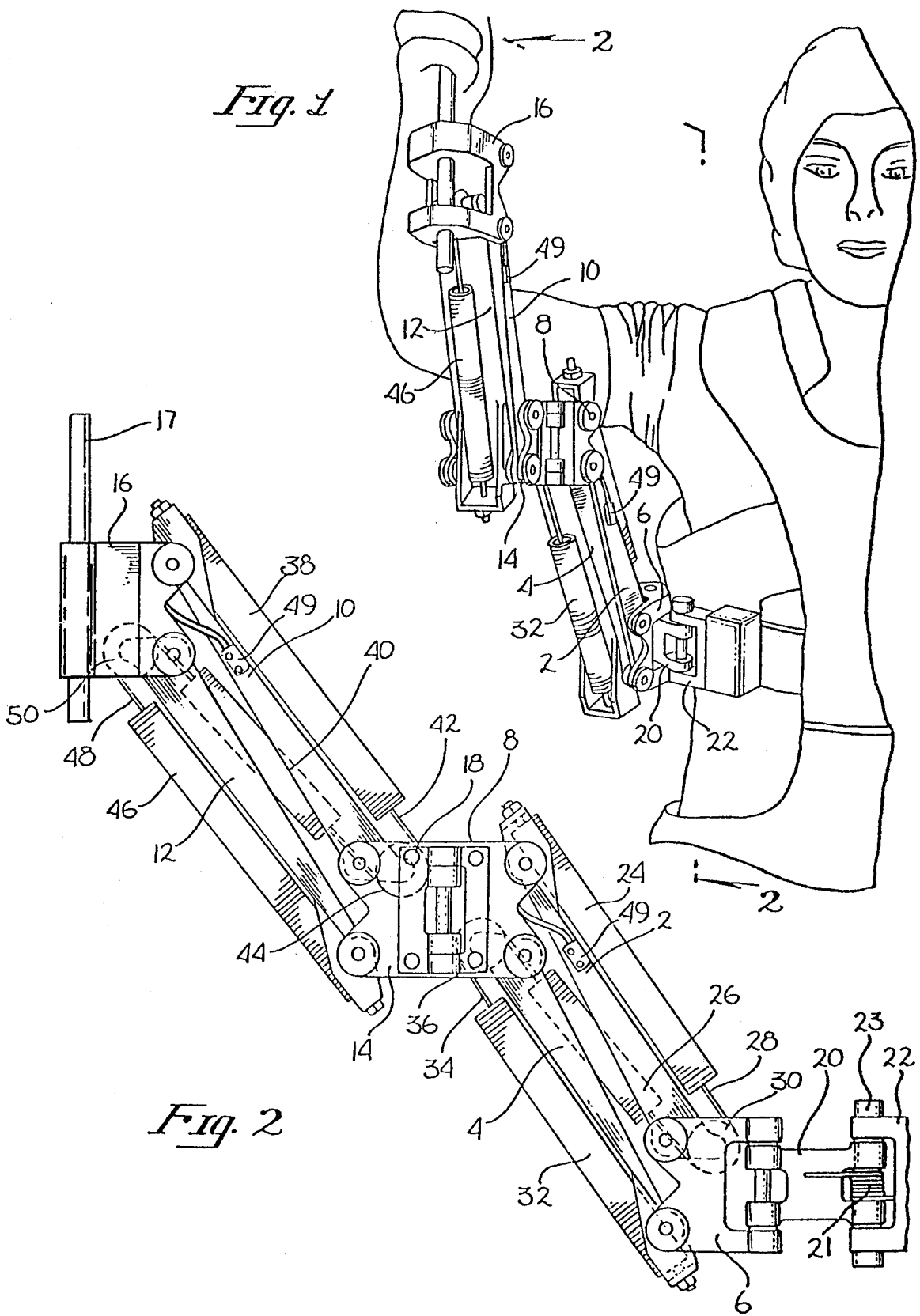

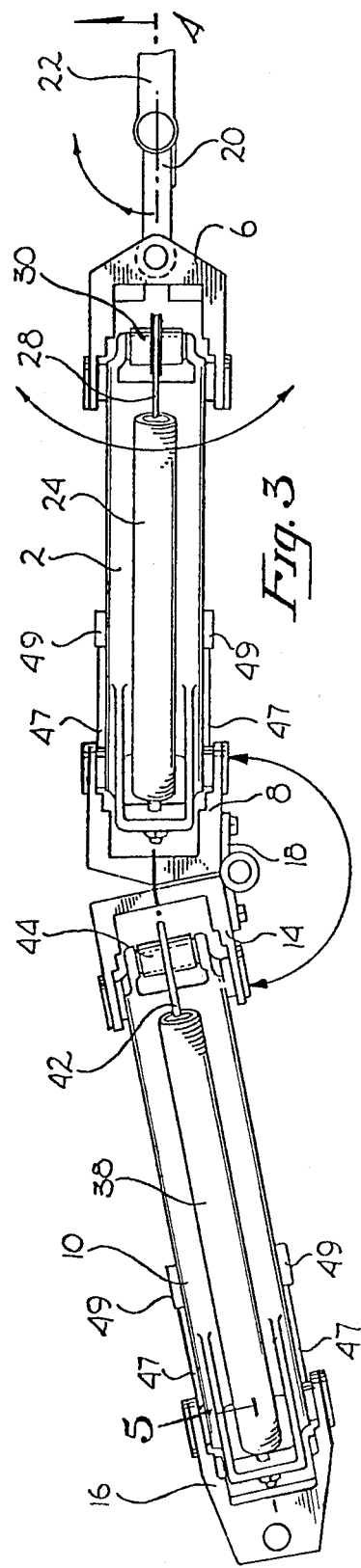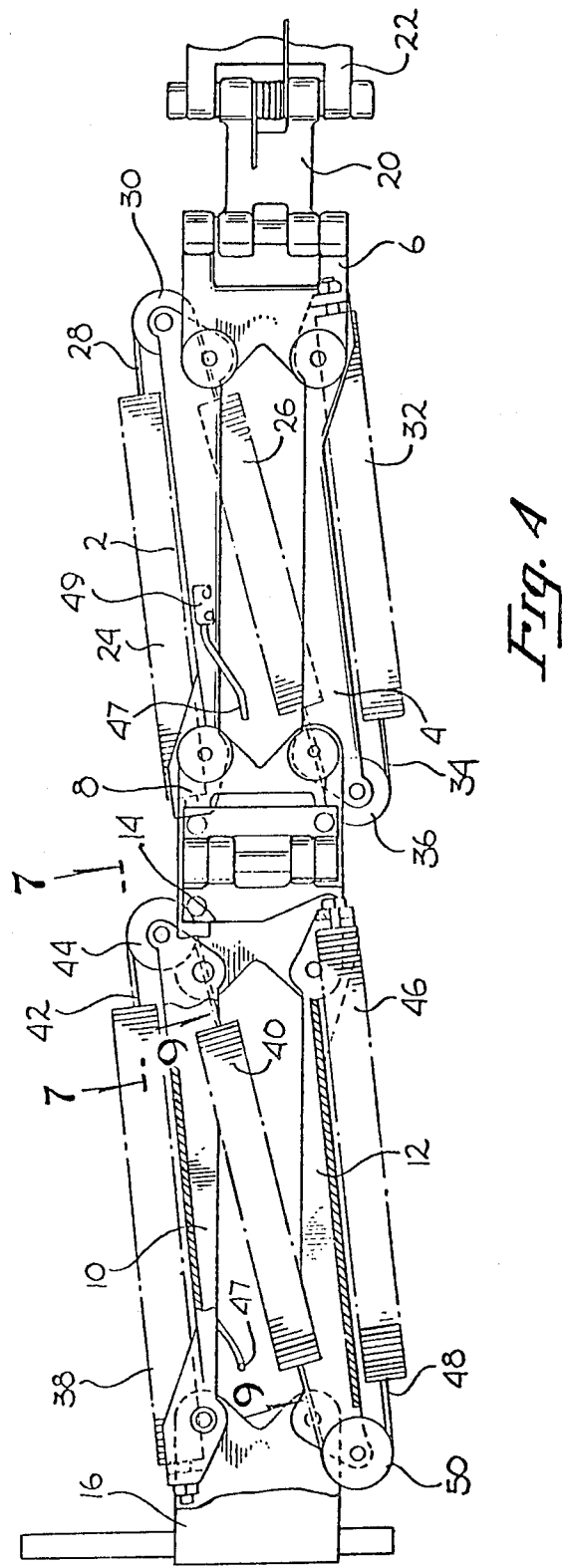

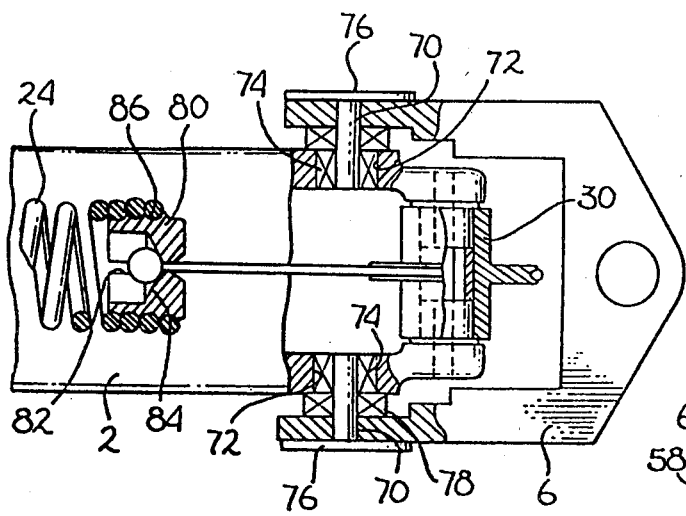
Fig. 7
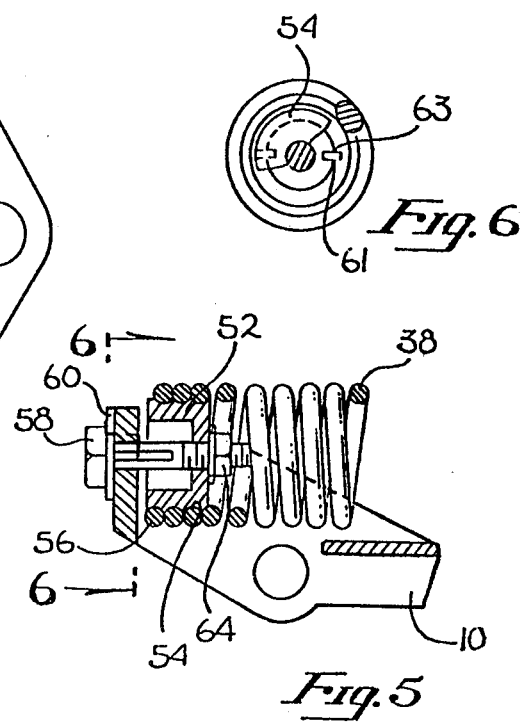
Fig. 6
Fig. 5
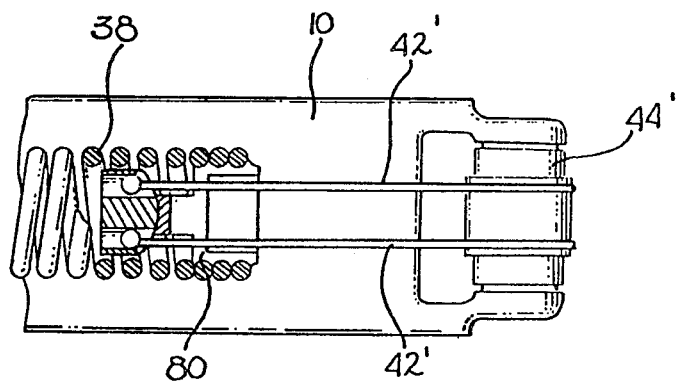
Fig. 8
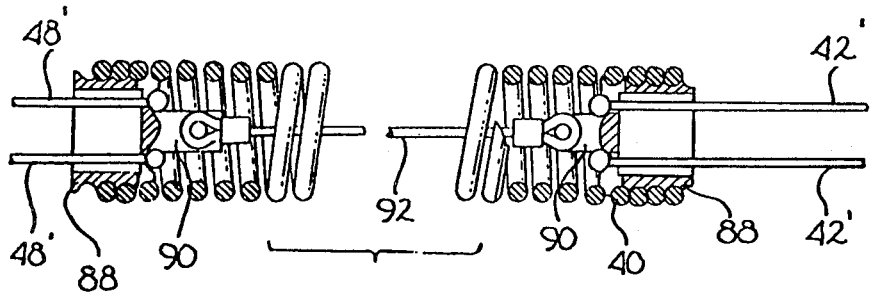
Fig. 9

SUPPORT APPARATUS

This is a continuation of application Ser. No. 700,544 filed June 28, 1976, now U.S. Pat. No. 4,208,028, which was a continuation-in-part of application Ser. No. 506,326 filed Sept. 16, 1974, now U.S. Pat. No. 4,017,168.

FIELD OF INVENTION

This invention relates to equipment supports and more particularly pertains to portable equipment utilized on conjunction with motion picture or television cameras.

DESCRIPTION OF THE PRIOR ART

In taking photographs with a strip film fed motion picture camera or when employing a video tape type of camera, it is extremely important that the camera be maintained in as stable a position as possible in order to obtain high quality results, Such stability commonly has been achieved by mounting the camera on a tripod or otherwise supporting the camera, either video tape or motion picture tape, on a stationary support so as to eliminate any possibility of the undesirable camera motion. Problems generally arise when it is desired to take motion pictures under conditions wherein it is necessary or desirable that the camera itself be mobile or be moved during the photographic process. In such procedures, it has been the usual prior art practice generally to mount the camera on a wheeled dolly, sometimes running on temporary tracks or on a constructed platform extending along the intended path of movement, thereby permitting the camera equipment to be moved along a smooth path. When it has been necessary or desirable to employ a hand-held camera, high quality results have generally been unobtainable when the cameraman walks or runs with the camera because of the attendant increase in instability, particularly the quick angular deviations along the axes of pan, tilt and roll, which cannot be adequately controlled. Such instability has heretofore been characteristic of hand-held motion picture photography.

In order to overcome the problems encountered in hand-held cimematography and to reduce the great expense normally encountered in construction of temporary tracks or temporary platforms, prior workers in the art have attempted to develop portable camera stabilizing devices. One such device has been disclosed in the U.S. Pat. No. 2,945,428. It was found that the camera had little or no mobility relative to the cameraman and that such devices required that the cameraman have his eye directly adjacent to the camera to properly direct the camera lens toward the object. These factors tend to limit the versatility of camera angles or types of shots which can be made with such devices. Furthermore, when the cameraman's body is in contact with the camera, his motions are directly transmitted to the camera resulting in jitter. Other prior workers in the art have attempted to solve the problem by employing gyro stabilizers and lens constructions which adjust the light paths entering the camera in order to produce a stabilized image. These devices also require that the camera be mounted in a relatively fixed position with respect to the cameraman. The prior art devices tend to restrict the speed of panning and tilting that can be achieved and are further deficient in that they introduce other arbitrary motions of their own if their inherent limits are exceeded by walking or running. Further, the prior art devices insofar as is known without exception, are of little benefit to translational stability or motion about the axis passing through the camera's lens. All of the prior art stabilizing devices of which we see familiar require the addition of considerable weight beyond that of the camera itself thereby introducing a factor directly relating to the strength of the cameraman himself. The foregoing factors tend to limit the versatility of prior art devices by limiting the camera angles and the type of shots which can be achieved by utilizing such equipment.

None of the prior art devices has been completely successful because of the lack of one or more of the requirements met by the present invention, namely:

1. inherent stability, that is, the tendency to resist the rapid angular motions around all three possible axes that plague hand-held shooting, and slow them down to the point that the human body can effectively deal with without introducing new ones;

2. perfect floatation and isolation, that is, relieving the cameraman of the necessity to exert force to support the camera, thus preserving the delicacy of touch required for fine control of the camera's motions and decoupling the camera from the cameraman's motions; and 3. minimum increased weight, that is, eliminating the need for balancing counterweights, particularly in the case of the heavier 35 mm motion picture camera and video cameras.

In U.S. patent application Ser. No. 506,326, filed by the assignee of the present application, is disclosed a solution to the above given difficulties.

One disadvantage noted in the function of the support arms of Ser. No. 506,326 was the possibility of the forearm acting out of synchronism with the rear arm since the device could operate only in one plane. It was possible for the forearm parallelogram to close while the upper arm was not yet closed. This severely restricted the range of operation. If it was attempted to raise the camera in a position close to the operator's body, it was found that there was an arc in which the arms could not function. It was then necessary to first push the camera forwardly as it was raised and then to pull the camera rearwardly.

Additionally, it was found that the weight was exactly in equilibrium with the upward force of the arms in only one position within the range of operation.

Accordingly, it is a general object of the present invention to provide an improved support for a weight such as a portable camera.

It is another object of the present invention to provide a support for a portable camera carried by an ambulatory cameraman which exactly compensates for the weight of the camera throughout its entire range.

It is still another object of the present invention to provide a support for a portable camera that is rugged in construction, inexpensive to manufacture and trouble free when in use.

It is still another object of the present invention to provide a support for a portable camera which works equally well with motion picture cameras and television cameras.

It is also an object of the present invention to provide a support for a portable camera which decouples the camera from the motion of the means which the support is mounted on.

SUMMARY OF THE INVENTION

In keeping with the principles of the present invention, the objects are accomplished with a unique support apparatus for a weight such as a portable camera comprising the unique combination of at least a pair of pivotably and rotatably interconnected arms, one end of which is pivotably and rotatably supported by a mounting means and the other end of which is arranged and configured to support a camera, and a spring means provided on each arm of the support apparatus to compensate for the weight applied to the end of each arm. In this manner the support arms and the pivotal and rotatable connections permit free floating of the camera and act to isolate the camera itself from the movements of the mounting means thereby preventing unwanted movement caused by the motion of the mounting means.

The pair of spring loaded support arms permit the load, such as an expanded camera, to essentially float freely in a manner to isolate the equipment from any movements of the operator. It will be noted that the equipment of the present invention functions to improve quality of results without adding significantly to the overall weight of the mobile equipment. The arms define parallelogram configurations wherein each parallelogram has a common side, comprising a hinged medial block or elbow.

The hinged elbow is employed intermediate the arms to allow the support arms to act more like the human arm and to follow closely the movements of the operator's arm. The present design allows the support arms to be considerably more flexible than the original design disclosed in Ser. No. 506,326 in which the arms could operate only in one plane, a vertical plane. A medial hinge bracket has been provided in place of the former medial block between the upper and lower arms. The medial hinge bracket operates to the left or the right only in a manner to follow the movements of the human arm.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 1 is a perspective view showing the support apparatus in accordance with the teachings of the present invention in use but without a camera mounted thereon;

FIG. 2 is a side elevation view of the apparatus of FIG. 1 looking along the lines 2—2;

FIG. 3 is a top plan view of the apparatus of FIG. 1;

FIG. 4 is a partial sectional side view of FIG. 3 looking along the lines 4—4;

FIG. 5 is a partial sectional view of FIG. 3 looking along the lines 5—5;

FIG. 6 is an enlarged partial sectional view of FIG. 5 looking along the lines 6—6;

FIG. 7 is an enlarged partial sectional view of the apparatus as shown in FIG. 4 looking along the lines 7—7;

FIG. 8 is a modified partial sectional view of an alternate arrangement of the apparatus as shown in FIG. 4 looking along the lines 7—7; and FIG. 9 is a modified enlarged partial view of the apparatus as shown in FIG. 4 looking along the lines 9—9.

DESCRIPTION OF THE PREFERRED EMBODIMENTS

Referring to the drawings, FIGS. 1-7 illustrate one embodiment of a support for a weight such as a portable camera in accordance with the teachings of the present invention. FIG. 1 shows a perspective view of the support apparatus as attached to a support vest which is worn by a cameraman. The support apparatus as shown in FIG. 1 basically breaks down into five (5) portions. The first portion being that portion which is adapted to connect to the support vest. The second and third portions comprise the forearm and upper arm. The fourth portion consists of a rotatable and pivotal connection between the forearm and upper arm and the fifth portion consists of the end of the forearm which is arranged and configured such that a camera may be mounted thereon. The particular implementation of a support apparatus in accordance with the teachings of the present invention will now be hereinafter discussed in reference to FIGS. 2-7.

In FIGS. 2-7, the support apparatus includes a pair of parallel upper arm links 2 and 4. The upper arm links 2 and 4 are pivotally coupled at one end to connector hinge bracket 6. The other ends of upper arm links 2 and 4 are pivotally coupled to upper arm medial hinge bracket 8. A second pair of parallel of forearm links 10 and 12 are pivotally coupled respectively between forearm medial bracket 14 and camera support bracket 16. Camera mounting pin 17 is provided in camera support bracket 16. Upper arm and forearm medial brackets 8 and 14 are rotatably coupled together along one side by a hinge 18. Connector hinge bracket 6 is rotatably coupled at its center to one end of lower support hinge plate 20. The other end of lower support hinge plate 20 is rotatably coupled to fixed support block 22 by a pin 23. A spring 21 through which pin 23 extends biases plate 20 in a clockwise direction.

One end of tension spring 24 is coupled to the end of upper arm link 2 which is pivotally coupled to upper arm medial hinge bracket 8. The other end of tension spring 24 is coupled to one end of tension spring 26 by a section of cable 28 which passes over and around pulley 30 which is rotatably coupled to upper arm link 2. The other end of tension spring 26 is coupled to one end of tension spring 32 via a section of cable 34 which rides on and around pulley 36 which is rotatably coupled to upper arm link 4. The other end of tension spring 32 is coupled to the end of upper arm link 4 adjacent connector hinge bracket 6.

Similar to the above, one end of tension spring 38 is coupled to the end of forearm link 10 adjacent to camera mounting bracket 16. The other end of tension spring 38 is coupled to tension spring 40 via a cable 42 which rides on and around pulley 44 which is rotatably coupled to forearm link 10. The other end of tension spring 40 is coupled to one end of tension spring 46 via a cable 48 which rides on and around pulley 50 which is rotatably coupled to forearm link 12. The other end of tension spring 46 is coupled to the end of forearm link 12 adjacent forearm medial hinge bracket 14.

A weight, such as a camera which is supported at the support bracket 16 behaves as an object in free space beyond gravity since the upward forces which the tension springs 24, 26, 32 and 38, 40, 46 exert in effect counteract gravity. The weight tends to travel in a straight line until influenced otherwise and tends to retain the same angle until influenced otherwise. In the configuration shown, the upper arm links 2, 4 roughly correspond to the upper arm (not shown) of the user in terms of its three dimensional geometry as it is used either high, low, or to either side.

The forearm links 10, 12 roughly correspond to the forearm of the user and roughly follows a parallel course to the user's forearm. The lower support hinge plate 20 provides the function of compensating for the motions of the front and to the rear of the user's shoulder. The lower support hinge plate 20 also allows the operator's arm to operate in the correct position for right handed use and swing the entire support arm structure to the left to allow the arms to operate out in front of the body for left handed use. The support hinge plate 20 also permits use back close to the user's shoulder and roughly parallel to the user's arm for right handed use. The support hinge plate 20 compensates for the necessary distance or movement of the operator's shoulder as the upper arm links 2, 4 traverse forward and to the rear as the operator (FIG. 1) reaches forward and rearwardly.

The upper arm medial hinge bracket 8 allows the combined upper arm and forearm to act like the human arm and allows considerably more flexibility. The hinge bracket provides novel phenomenon which is unexpected. The human arm (FIG. 1) can bend in only one direction and the hinged elbow allows duplication of this movement by the upper arm and forearm. The hinged elbow 8, 14, 18 permits the operation of the weight, such as a camera, to the right side of the user's body and close in with full up and down mobility without the arms locking. The hinged elbow 8, 14, 18 and the lower support hinge plate 20 permit the same up and down mobility directly in front of the operator as close as can be. The lower support hinge plate 20 compensates for the movements of the operator's shoulder.

The hinged elbow between two spring loaded parallelograms has no effect on their load bearing ability even as the hinge 18 is deployed throughout its entire range.

Furthermore, snubber spring 47 and shuber spring mounting block 49 are provided on both sides of the upper ends of forearm link 10 and upper arm link 2. The snubber spring 47 and snubber spring mounting block 49 are arranged and configured such that at the upper limit of movement of the support apparatus the snubber springs engage with upper arm medial hinge bracket 8 and camera mounting bracket 16 and at the lower limit of movement engage with the top edge of upper arm link 4 and forearm link 12. The snubber springs 47 exert a counteractive force at the extremities of movement of the support apparatus to insure smooth operation of the upper arm and forearm over the full range of movement.

The coupling of one end of the tension spring to a link will now be described in detail by referring to FIGS. 5 and 6. In FIG. 5, the tension spring 38 is threaded onto a cylindrical block 52 having a helical groove pattern 54 formed in the outside cylindrical surface. A mounting bracket 56 is formed in the end of forearm link 10. Cylindrical block 52 is coupled to mounting bracket 56 by a bolt 58 which passes through washer 60, a hole in support bracket 56 and a hole in hollow cylindrical block 52. A nut 64 is swaged onto the end of the hollow cylindrical block 52 and threadedly receives the bolt 58 to secure the parts. Furthermore, washer 60 has two fins 61 projecting axially from its surface which pass through two slots 63 in bracket 56 and engage two slots 65 on the inner cylindrical surface of block 52 thereby preventing rotation of block 52. Furthermore, as a result of swaging nut 64 being nonrotatably coupled to hollow cylindrical block 52, the tension on the spring assembly can be adjusted by rotating bolt 58 clockwise or counterclockwise.

Referring to FIG. 7, shown therein is an example of a low friction self-centering rotatable coupling between a link and a bracket. In particular, connector hinge bracket 6 is provided with pairs of opposing holes 70. Link 2 is provided with pairs of opposing holes 72 into which bearings 74 are mounted. A pair of coupling pins 76 are inserted through holes 70 in connector hinge bracket 6 and into bearing 74 mounted in hole 74 of arm 2. In order to eliminate any sliding friction between arm 2 and connector hinge bracket 6 and to maintain the link 2 in a fixed position, a pair of thrust bearings 78 is provided between the inside surface of connector hinge bracket 6 and the outside surface of upper arm link 2. In this manner, the rotational friction between connector hinge bracket 6 and upper arm link 2 is kept to a minimum.

Referring further to FIG. 7, shown therein is a means for connecting the cable to one end of the tension springs. The means for coupling the cable to one end of the tension springs consists of a cylindrical hollow block 80. The hollow cylindrical block 80 is further provided with a slot 82 which extends from the side of the cylindrical block 80 to its center. The bottom inside surface of hollow cylindrical block 80 is further provided with a conical depression 84 and a helical groove 86 is formed in the outside surface of hollow cylindrical block 80.

To couple the cable to the spring, first the cable having a ball fixed to its end is slipped into the slot 82 in hollow cylindrical block 80. The ball fixed to the end of cable 28 fits into conical depression 84 thereby holding the cable in the center of the cylindrical hollow block 80. Spring 24 is then threaded onto the helical groove 86 formed in the outside surface of hollow cylindrical block 80.

In practice the length of the support apparatus should be approximately equal to the length of the arm of a cameraman. Furthermore, the bearings 78 and 74 may be any type of low friction bearing which exists in the art and which performs the desired function. In addition, the support may be made up of any number of arms greater than one (1) arm. Furthermore, the camera may be similar to the expanded camera disclosed in U.S. patent application Ser. No. 506,306 filed Sept. 16, 1974.

In operation, the segmented spring comprising tension springs 24, 26 and 32 interconnected by cables 28 and 34 act together as a single tension spring mounted diagonally across the parallelogram formed by upper arm links 2 and 4 and connector hinge bracket 6 and upper arm medial hinge bracket 8. This equivalent tension spring exerts a force which is equal to the weight applied to the end of the parallelogram times the length of the diagonal of the parallelogram along which the spring extends divided by the distance between the attachment points of links 2 and 4 on upper arm medial hinge bracket 8. Accordingly, the equivalent diagonal tension spring exerts a force which exactly compensates for the weight applied to the end of the parallelogram regardless of how the parallelogram is moved in a vertical plane. Therefore, once the equivalent tension spring is adjusted to compensate for the weight applied to the end of the parallelogram, in this case to the upper arm medial hinge bracket 8, it will exactly compensate for this weight at all angles of movement. For the parallelogram consisting of upper arm links 2 and 4 and connector hinge bracket 6 and upper arm medial hinge bracket 8, the weight applied consists essentially of the remainder of the support apparatus plus the weight of the camera.

Similarly to that previously described, the segmented spring consisting of tension springs 38, 40 and 46 interconnected by cables 42 and 48 act as a diagonal tension spring extending across the diagonal parallelogram consisting of forearm links 10 and 12 and forearm medial hinge bracket 14 and camera support bracket 16. For the parallelogram consisting of links 10 and 12 and forearm hinge bracket 14 and camera support bracket 16, the weight applied consists substantially of the weight of the camera mounted on the camera support bracket 16.

Furthermore, at the extremities of movement of the support apparatus there are large moments applied to the ends of the forearm and upper arm which tend to distort the parallelogram. Since there are these large moments, snubber springs 47 are provided to exert a counteractive force at the extremities of movement of the support apparatus to prevent distortion of the parallelogram and insure smooth operation over the full range of movement.

Since as previously described, the weight applied to each section of the support apparatus is exactly compensated by that section's equivalent diagonal spring, the weight of the camera fixed on camera support bracket 16 is exactly compensated at all positions of the support apparatus. Furthermore, since the weight of the camera is compensated for at all positions of the support apparatus and there is a very small amount of friction in the linkage of the support apparatus, substantially none of the motion of the cameraman is transmitted to the camera as a result of the camera's own inertia. Therefore, it is possible for the cameraman to move up and down without affecting the position of the camera mounted on the support apparatus. To provide for motion in the horizontal plane, hinge 18 allows the upper arm and forearm section of the support apparatus to rotate relative to each other as shown by the curved arrow in FIG. 3. Furthermore, the support apparatus may rotate relative to the cameraman at the rotational connection at the connector hinge bracket 6 and lower support hinge plate 20. As a result of this allowable movement and in particular the movement of the upper section relative to the lower section, the mobility of the cameraman is increased.

For those situations where the camera is very heavy, it may be desirable to modify the support apparatus as shown in FIGS. 8 and 9. In this modification the single cable 42 between the tension springs is replaced by a double cable 42'. Since there are two cables 42', the pulley 44 must be modified as shown by the pulley 44' in FIG. 8 to accommodate the two cables 42'. Furthermore, the cylinderical block which couples the cables to the tension spring 38 must also be modified to two cables as shown by the cylinderical block 80'.

In particular, the cylinderical block 80' is provided with a concave seat 81 which engages with rocker 83. The rocker 83 engages with the balls on the ends of cables 42' and compensates for the variations which occur in cable length, thereby insuring that the load is divided equally between the cables 42'.

Referring to FIG. 9, shown therein is a modified form of the diagonal spring 40 with the additional modification of a safety cable. In FIG. 9 the cylindrical blocks 88 are provided not only with a means for coupling the cables 42' to the block 88 and a helical groove onto which the tension spring 40 is threaded, but also a projection 90 to which a safety cable 92 is attached. In this way if the tension spring 40 were to break or to become disconnected from the hollow cylindrical block 88, the safety cable 92 would prevent the spring from flying off and causing injury to someone and also would prevent the total collapse of the support apparatus. Furthermore, it should be apparent that the spring 26 could be modified in a similar manner as the spring 40 shown in FIG. 9.

Furthermore, it should be apparent to one skilled in the art that the above described support apparatus could be coupled to any means of support other than a cameraman; i.e. a car, horse, airplane, etc. In addition, the support apparatus could be used to support many other devices besides a camera; i.e. a weapon, an instrument, etc. Also, it should be apparent that any configuration of springs whether internal or external which exerts the desired force on the diagonal of the parallelogram would operate equally as well as that described.

In all cases it is understood that the above described embodiments are merely illustrative of but a small number of the many specific embodiments which can represent applications of the principles of the present invention. Numerous and varied other arrangements can be readily devised in accordance with these principles by those skilled in the art without departing from the spirit and scope of the invention.

We claim:

1. A weight support apparatus system especially adapted for operation as a portable device on a moving carrier and capable of being guided by the arm of an operator which comprises:

weight support means comprising first and second ends, the first end being connected to and adapted to support at least part of the weight, the second end being connected to the carrier, said weight support means comprising at least a pair of first and second interconnected support arms, said support arms being adapted to damp out vibrations due to movement of the carrier, each of the support arms comprising an upper and a lower longitudinal link and a medial bracket, which upper and lower links and medial brackets respectively form legs of a parallelogram, the respective upper and lower links and the medial bracket of each arm being pivotally interconnected to permit vertical rotative movement of one arm relative to the other, the first and second support arms each comprising respectively a first resilient means and a second resilient means, the first and second resilient means continuously biasing respectively the ends of the support arms that are remote from the carrier upwardly relative to the carrier, the bias of the first and second resilient means being substantially balanced by the weight, the first and second resilient means being connected respectively across the parallelograms to damp out vibrations caused by movement of the carrier and to cause the weight to free-float irrespective of movement of the carrier, said weight support means substantially freeing the operator's hands from the weight and capable of being guided to a desired position selected by the operator; and rotatable hinge bracket means interconnecting the medial brackets of the support arms, the hinge bracket means comprising a vertical pivot pin to permit horizontal rotatable movement of one arm relative to the other, whereby the weight is isolated and free-floating at a distance from the operator substantially independent of any unwanted lateral and vertical vibrations caused by motion of the carrier.

2. The weight support apparatus system of claim 1, wherein the hinge bracket means comprises means to duplicate the movements of the operator's arm by permitting rotation of the first support arm about the pivot pin relative to the second support arm from a substantially aligned position to a substantially parallel position in a first direction and by prohibiting rotation of the first support arm about the pivot pin relative to the second support arm from the substantially aligned position in a second opposite direction.

3. The weight support apparatus system of claim 1 wherein the weight support means comprises hinge plate means at the end closest the carrier to permit horizontal rotatable movement of the support means relative to the carrier.

4. A weight support apparatus system especially adapted for supporting a portable device on a moving carrier, the system supporting the device with improved stability in a substantially free-floating manner to isolate the device from unwanted lateral and vertical vibrations caused by motion of the carrier which comprises:

a pair of first and second interconnected, equipoising, parallelogram linkage support arms, said interconnected support arms having a first end adapted to be connected to the carrier and a second end adapted to be connected to the portable device;

first rotatable means interconnecting the support arms, said first rotatable means comprising a vertical pin adapted to permit horizontal rotatable movement of one support arm relative to the other;

a compressible and expandable means provided on each of the arms and adapted to exert a force across the diagonals of the parallelogram linkage of the said arms, said forces being sufficient to counteract the weight of the device applied at the said second end, the compressible and expandable means exerting a damping force across the diagonals of the parallelogram linkages sufficient to damp out vibrations due to movement of the carrier;

second rotatable means interconnecting the said first end to the carrier, the said second rotatable means being adapted to permit horizontal rotatable movement of the interconnected arms relative to the carrier; and third rotatable means forming portions of the first and second support arms, the third rotatable means comprising a plurality of horizontally oriented pivot pins, the pivot pins being adapted to permit vertical rotatable movement of one support arm relative to the other.

5. The weight support apparatus system of claim 4 wherein the first rotatable means comprises a hinge including a pair of first and second hinge plates, the hinge plates being rotatably interconnected by the vertical pin.

6. The weight support apparatus system of claim 5 and a first medial bracket forming part of the parallelogram linkage of the first support arm, the first hinge plate being affixed to the first medial bracket whereby the first support arm can be horizontally rotated about the pin.

7. The weight support apparatus system of claim 5 or 6 and a second medial bracket forming a part of the parallelogram linkage of the second support arm, the second hinge plate being affixed to the second medial bracket.

* * * * *